(12) United States Patent
Jeon

(10) Patent No.: US 10,223,692 B2
(45) Date of Patent: Mar. 5, 2019

(54) METHOD FOR SETTING TEMPORARY PAYMENT CARD AND MOBILE DEVICE APPLYING THE SAME

(71) Applicant: MOZIDO CORFIRE-KOREA, LTD., Seongnam-si, Gyeonggi-do (KR)

(72) Inventor: Min Hwan Jeon, Gwangju-si (KR)

(73) Assignee: Mozido Corfire-Korea, LTD. (KR)

( * ) Notice: Subject to any disclaimer, the term of this patent is extended or adjusted under 35 U.S.C. 154(b) by 273 days.

(21) Appl. No.: 14/647,859

(22) PCT Filed: Aug. 29, 2013

(86) PCT No.: PCT/KR2013/007775
§ 371 (c)(1),
(2) Date: May 28, 2015

(87) PCT Pub. No.: WO2014/084484
PCT Pub. Date: Jun. 5, 2014

(65) Prior Publication Data
US 2015/0302396 A1    Oct. 22, 2015

(30) Foreign Application Priority Data
Nov. 28, 2012 (KR) .................. 10-2012-0135940

(51) Int. Cl.
*G06Q 20/36* (2012.01)
*G06Q 20/32* (2012.01)
(Continued)

(52) U.S. Cl.
CPC ........... *G06Q 20/36* (2013.01); *G06F 3/0482* (2013.01); *G06F 3/04842* (2013.01);
(Continued)

(58) Field of Classification Search
CPC .. G06Q 20/36; G06Q 20/0652; G06Q 20/227; G06Q 20/32; G06Q 20/322;
(Continued)

(56) References Cited

U.S. PATENT DOCUMENTS 4,717,815 A * 1/1988 Tomer ................ G06Q 20/0652
235/378
6,490,601 B1 * 12/2002 Markus ................. G06F 17/243
705/80
(Continued)

FOREIGN PATENT DOCUMENTS

EP       1758053      2/2007
GB       2447051      9/2008
(Continued)

OTHER PUBLICATIONS

Ghag, O., & Hegde, S. (2012). A comprehensive study of google wallet as an NFC application. International Journal of Computer Applications, 58(16), n/a. doi:http://dx.doi.org/10.5120/9369-3825 (Year: 2012).*
(Continued)

*Primary Examiner* — Kito R Robinson
(74) *Attorney, Agent, or Firm* — Workman Nydegger

(57) ABSTRACT

A method for setting a temporary payment card and a mobile device applying the same are provided. The method includes: displaying a list of mobile payment cards; setting, as a temporary payment card, a mobile payment card which is moved by a user from among the mobile payment card listed in the list; and resetting the setting of the temporary payment card when a payable time passes. Accordingly, the temporary payment card can be changed more easily and swiftly.

13 Claims, 20 Drawing Sheets

(51) Int. Cl.
*G06F 3/0482* (2013.01)
*G06F 3/0484* (2013.01)
*G06Q 20/22* (2012.01)
*G06Q 20/06* (2012.01)

(52) U.S. Cl.
CPC ....... *G06Q 20/0652* (2013.01); *G06Q 20/227* (2013.01); *G06Q 20/32* (2013.01); *G06Q 20/322* (2013.01); *G06Q 20/3278* (2013.01); *G06Q 20/363* (2013.01)

(58) Field of Classification Search
CPC .............. G06Q 20/3278; G06Q 20/363; G06F 3/0482; G06F 3/04842
USPC .......................................................... 705/41
See application file for complete search history.

(56) References Cited

U.S. PATENT DOCUMENTS

| | | | |
|---|---|---|---|
| 6,512,919 B2 | 1/2003 | Ogasavara | |
| 6,587,835 B1 | 7/2003 | Treyz et al. | |
| 6,636,833 B1 | 10/2003 | Flitcroft et al. | |
| 6,755,342 B1 | 6/2004 | Jordan, Jr. | |
| 7,065,195 B1* | 6/2006 | Smith | G06K 19/041 379/114.01 |
| 7,707,113 B1* | 4/2010 | DiMartino | G06Q 20/105 705/41 |
| 7,967,196 B1* | 6/2011 | Bierbaum | G06Q 20/127 235/375 |
| 7,984,510 B2 | 7/2011 | Morikawa | G06Q 20/04 235/380 |
| 8,116,734 B2 | 2/2012 | Vawter | |
| 8,195,576 B1 | 6/2012 | Grigg et al. | |
| 8,271,344 B1 | 9/2012 | Channakeshava et al. | |
| 8,403,215 B2 | 3/2013 | Aihara et al. | |
| 8,639,291 B1* | 1/2014 | Gailloux | H04W 52/0274 455/558 |
| 8,768,249 B2* | 7/2014 | Avadhanam | G06F 9/44505 340/501 |
| 8,849,706 B2 | 9/2014 | King | |
| 8,887,997 B2* | 11/2014 | Barret | G06Q 20/02 235/375 |
| 8,959,143 B2* | 2/2015 | Singh | H04L 67/34 709/203 |
| 9,317,846 B2 | 4/2016 | Baldwin et al. | |
| 9,361,606 B2* | 6/2016 | Hertel | G06Q 20/02 |
| D763,888 S* | 8/2016 | Patel | D14/486 |
| D803,869 S* | 11/2017 | Kuhn | D14/488 |
| 9,990,126 B2* | 6/2018 | Chanyontpatanakul | G06F 3/04883 |
| 2002/0071076 A1 | 6/2002 | Webb | |
| 2003/0132298 A1 | 7/2003 | Swartz et al. | |
| 2003/0225642 A1* | 12/2003 | Baker | G06Q 20/10 705/35 |
| 2004/0111320 A1 | 6/2004 | Schlieffers et al. | |
| 2004/0225567 A1 | 11/2004 | Mitchell et al. | |
| 2004/0230489 A1 | 11/2004 | Goldthwaite et al. | |
| 2005/0187873 A1 | 8/2005 | Labrou et al. | |
| 2005/0230472 A1 | 10/2005 | Chang | |
| 2006/0165060 A1 | 7/2006 | Dua | |
| 2006/0179404 A1* | 8/2006 | Yolleck | G06F 17/243 715/272 |
| 2006/0208065 A1* | 9/2006 | Mendelovich | G06Q 20/04 235/380 |
| 2006/0219780 A1 | 10/2006 | Swartz et al. | |
| 2007/0210155 A1 | 9/2007 | Swartz et al. | |
| 2008/0059379 A1* | 3/2008 | Ramaci | G06Q 20/105 705/66 |
| 2008/0242274 A1 | 10/2008 | Swanburg et al. | |
| 2009/0069056 A1* | 3/2009 | Lee | G06F 1/3203 455/566 |
| 2009/0094100 A1 | 4/2009 | Xavier | |
| 2009/0173781 A1* | 7/2009 | Ramachandran | G06Q 20/042 235/379 |
| 2009/0228966 A1 | 9/2009 | Parfene et al. | |
| 2009/0288012 A1* | 11/2009 | Hertel | G06Q 20/02 715/738 |
| 2009/0309701 A1* | 12/2009 | Peled | G06Q 20/341 340/5.83 |
| 2010/0049615 A1 | 2/2010 | Rose et al. | |
| 2010/0063893 A1 | 3/2010 | Townsend | |
| 2010/0082447 A1 | 4/2010 | Lin et al. | |
| 2010/0094774 A1* | 4/2010 | Jackowitz | G06Q 40/00 705/36 R |
| 2010/0133335 A1 | 6/2010 | Maguid et al. | |
| 2010/0174649 A1 | 7/2010 | Bouchard | |
| 2010/0205045 A1 | 8/2010 | Zhang et al. | |
| 2010/0287057 A1 | 11/2010 | Aihara et al. | |
| 2011/0082765 A1 | 4/2011 | Mazor | |
| 2011/0254796 A1 | 10/2011 | Adamson et al. | |
| 2011/0320293 A1 | 12/2011 | Khan | |
| 2012/0054841 A1 | 3/2012 | Schultz et al. | |
| 2012/0099756 A1 | 4/2012 | Sherman et al. | |
| 2012/0123937 A1* | 5/2012 | Spodak | G06K 19/06187 705/41 |
| 2012/0172026 A1 | 7/2012 | Kwon et al. | |
| 2012/0172089 A1 | 7/2012 | Bae et al. | |
| 2012/0197743 A1 | 8/2012 | Grigg et al. | |
| 2012/0234918 A1 | 9/2012 | Lindsay | |
| 2012/0290420 A1 | 11/2012 | Close | |
| 2012/0317628 A1 | 12/2012 | Yeager | |
| 2013/0041752 A1 | 2/2013 | Crum | |
| 2013/0080289 A1 | 3/2013 | Roy et al. | |
| 2013/0084797 A1* | 4/2013 | Avadhanam | G06F 9/44505 455/41.1 |
| 2013/0110676 A1 | 5/2013 | Kobres | |
| 2013/0185150 A1 | 7/2013 | Crum | |
| 2013/0215116 A1 | 8/2013 | Siddique et al. | |
| 2013/0346302 A1* | 12/2013 | Purves | G06Q 20/102 705/40 |
| 2014/0025520 A1 | 1/2014 | Mardikar et al. | |
| 2014/0040120 A1* | 2/2014 | Cho | G06Q 20/3278 705/39 |
| 2014/0040128 A1* | 2/2014 | Park | G06Q 20/108 705/42 |
| 2014/0058944 A1 | 2/2014 | Ballout | |
| 2014/0122563 A1* | 5/2014 | Singh | H04L 67/34 709/203 |
| 2014/0222597 A1* | 8/2014 | Nadella | G06Q 20/204 705/21 |
| 2014/0337230 A1 | 11/2014 | Bacastow | |
| 2014/0351071 A1 | 11/2014 | Hong et al. | |
| 2015/0073983 A1* | 3/2015 | Bartenstein | G06Q 20/3415 705/41 |
| 2015/0134513 A1* | 5/2015 | Olson | G06K 19/06206 705/39 |
| 2015/0346994 A1* | 12/2015 | Chanyontpatanakul | G06F 3/04883 715/828 |
| 2016/0027002 A1* | 1/2016 | Choi | G06Q 20/367 705/41 |

FOREIGN PATENT DOCUMENTS

| | | |
|---|---|---|
| GB | 2476989 | 7/2011 |
| JP | 2002324216 | 11/2002 |
| JP | 2005276000 | 10/2005 |
| JP | 2007172576 | 7/2007 |
| JP | 2009146708 | 7/2009 |
| JP | 2010541059 | 12/2010 |
| JP | 2011022811 | 2/2011 |
| JP | 2012118637 | 6/2012 |
| JP | 2015069269 | 4/2015 |
| KR | 20000014806 | 3/2000 |
| KR | 20000037129 | 7/2000 |
| KR | 20000049878 | 8/2000 |
| KR | 20010000616 | 1/2001 |
| KR | 20010010526 | 2/2001 |
| KR | 20010086959 | 9/2001 |
| KR | 20010090905 | 10/2001 |
| KR | 20010102052 | 11/2001 |

(56) References Cited

FOREIGN PATENT DOCUMENTS

| | | |
|---|---|---|
| KR | 100321529 | 1/2002 |
| KR | 20020016161 | 3/2002 |
| KR | 20020017784 | 3/2002 |
| KR | 20020069040 | 8/2002 |
| KR | 20020070669 | 9/2002 |
| KR | 20030040370 | 5/2003 |
| KR | 20030042639 | 6/2003 |
| KR | 20030047962 | 6/2003 |
| KR | 20030075062 | 9/2003 |
| KR | 20030081817 | 10/2003 |
| KR | 20040099041 | 11/2004 |
| KR | 20050017948 | 2/2005 |
| KR | 20050114635 | 12/2005 |
| KR | 20060016612 | 2/2006 |
| KR | 20060035421 | 4/2006 |
| KR | 20060039997 | 5/2006 |
| KR | 20060086188 | 7/2006 |
| KR | 100627726 | 9/2006 |
| KR | 100627916 | 9/2006 |
| KR | 20060099899 | 9/2006 |
| KR | 20060108845 | 10/2006 |
| KR | 20060109303 | 10/2006 |
| KR | 20060132763 | 12/2006 |
| KR | 20070020767 | 2/2007 |
| KR | 20070021348 | 2/2007 |
| KR | 20070021461 | 2/2007 |
| KR | 20070044993 | 5/2007 |
| KR | 20070047264 | 5/2007 |
| KR | 20070051817 | 5/2007 |
| KR | 20070065863 | 6/2007 |
| KR | 20070070573 | 7/2007 |
| KR | 20070072814 | 7/2007 |
| KR | 20070091808 | 9/2007 |
| KR | 20070104049 | 10/2007 |
| KR | 20070120223 | 12/2007 |
| KR | 20080009242 | 1/2008 |
| KR | 20080025238 | 3/2008 |
| KR | 20080050208 | 6/2008 |
| KR | 20080054790 | 6/2008 |
| KR | 20080087059 | 9/2008 |
| KR | 100861390 | 10/2008 |
| KR | 20080087917 | 10/2008 |
| KR | 20080096857 | 11/2008 |
| KR | 20090001385 | 1/2009 |
| KR | 20090029533 | 3/2009 |
| KR | 20090070814 | 7/2009 |
| KR | 20090081945 | 7/2009 |
| KR | 20090098766 | 9/2009 |
| KR | 20090099853 | 9/2009 |
| KR | 20090106103 | 10/2009 |
| KR | 20090117312 | 11/2009 |
| KR | 20090122321 | 11/2009 |
| KR | 20100004390 | 1/2010 |
| KR | 20100020539 | 2/2010 |
| KR | 20100022890 | 3/2010 |
| KR | 20100024102 | 3/2010 |
| KR | 20100029011 | 3/2010 |
| KR | 20100034682 | 4/2010 |
| KR | 20100043423 | 4/2010 |
| KR | 20100054017 | 6/2010 |
| KR | 20100058401 | 6/2010 |
| KR | 20100104732 | 9/2010 |
| KR | 100988528 | 10/2010 |
| KR | 20100106256 | 10/2010 |
| KR | 20110010880 | 2/2011 |
| KR | 20110019678 | 2/2011 |
| KR | 20110032350 | 3/2011 |
| KR | 20110039902 | 4/2011 |
| KR | 20110044131 | 4/2011 |
| KR | 20110049649 | 5/2011 |
| KR | 20110064182 | 6/2011 |
| KR | 20110065814 | 6/2011 |
| KR | 20110066025 | 6/2011 |
| KR | 20110068116 | 6/2011 |
| KR | 101245272 | 7/2011 |
| KR | 20110086614 | 7/2011 |
| KR | 20110090642 | 8/2011 |
| KR | 20110096011 | 8/2011 |
| KR | 20110096038 | 8/2011 |
| KR | 20110099951 | 9/2011 |
| KR | 20110109073 | 10/2011 |
| KR | 20110111801 | 10/2011 |
| KR | 20110112594 | 10/2011 |
| KR | 20110114872 | 10/2011 |
| KR | 20110125757 | 11/2011 |
| KR | 101092786 | 12/2011 |
| KR | 101116009 | 2/2012 |
| KR | 20120013867 | 2/2012 |
| KR | 20120020915 | 3/2012 |
| KR | 20120047721 | 5/2012 |
| KR | 20120051950 | 5/2012 |
| KR | 20120075947 | 7/2012 |
| KR | 20120080283 | 7/2012 |
| KR | 20120081483 | 7/2012 |
| KR | 20120081886 | 7/2012 |
| KR | 20120092035 | 8/2012 |
| KR | 20120094539 | 8/2012 |
| KR | 20120097157 | 9/2012 |
| KR | 20120103420 | 9/2012 |
| KR | 20120105596 | 9/2012 |
| KR | 20120105600 | 9/2012 |
| KR | 20120115620 | 10/2012 |
| KR | 20120122217 | 11/2012 |
| KR | 20120126146 | 11/2012 |
| KR | 101228442 | 1/2013 |
| KR | 20130004727 | 1/2013 |
| KR | 20130022345 | 3/2013 |
| KR | 20130027177 | 3/2013 |
| KR | 20130033616 | 4/2013 |
| KR | 20130057065 | 5/2013 |
| KR | 20130067887 | 6/2013 |
| KR | 20130075752 | 7/2013 |
| KR | 20130080935 | 7/2013 |
| KR | 20130082724 | 7/2013 |
| KR | 20130083029 | 7/2013 |
| KR | 101297468 | 8/2013 |
| KR | 20130089817 | 8/2013 |
| KR | 101309431 | 9/2013 |
| KR | 20130102739 | 9/2013 |
| KR | 101314510 | 10/2013 |
| KR | 20130108442 | 10/2013 |
| KR | 20130127558 | 10/2013 |
| KR | 20130130330 | 10/2013 |
| KR | 20140021323 | 2/2014 |
| KR | 101369540 | 3/2014 |
| KR | 101395719 | 5/2014 |
| KR | 101412431 | 6/2014 |
| KR | 20140069517 | 6/2014 |
| KR | 101416817 | 7/2014 |
| KR | 20140096202 | 7/2014 |
| KR | 101430141 | 8/2014 |
| KR | 101448085 | 10/2014 |
| KR | 101448547 | 10/2014 |
| KR | 101455155 | 10/2014 |
| KR | 101460179 | 11/2014 |
| KR | 101460182 | 11/2014 |
| KR | 101462999 | 11/2014 |
| KR | 101467177 | 12/2014 |
| KR | 101471305 | 12/2014 |
| KR | 101473576 | 12/2014 |
| KR | 20150022259 | 3/2015 |
| KR | 101514749 | 4/2015 |
| KR | 101514750 | 4/2015 |
| KR | 101514751 | 4/2015 |
| KR | 101514752 | 4/2015 |
| KR | 20150040424 | 4/2015 |
| KR | 20150042648 | 4/2015 |
| KR | 20150048370 | 5/2015 |
| KR | 20150049119 | 5/2015 |
| KR | 20150049126 | 5/2015 |
| KR | 20150053831 | 5/2015 |
| KR | 20150059546 | 6/2015 |
| KR | 20150059548 | 6/2015 |
| KR | 20150059698 | 6/2015 |

(56) References Cited

FOREIGN PATENT DOCUMENTS

| | | |
|---|---|---|
| KR | 20150071067 | 6/2015 |
| WO | 2009112793 | 9/2009 |
| WO | 2013081421 | 6/2013 |
| WO | 2013100637 | 7/2013 |
| WO | 2014084484 | 6/2014 |
| WO | 2014084603 | 6/2014 |
| WO | 2014084606 | 6/2014 |
| WO | 2015026183 | 2/2015 |
| WO | 2015026184 | 2/2015 |
| WO | 2015060661 | 4/2015 |
| WO | 2015060663 | 4/2015 |
| WO | 2015064983 | 5/2015 |
| WO | 2015064985 | 5/2015 |
| WO | 2015064986 | 5/2015 |
| WO | 2015076604 | 5/2015 |
| WO | 2015076605 | 5/2015 |
| WO | 2015093757 | 6/2015 |

OTHER PUBLICATIONS

Kutler, J. (1999). Trintech virtual card uses new digital standard @sh#1st consumer application of electronic commerce modeling language. American Banker, 164(117), 17(1). Retrieved from https://dialog.proquest.com/professional/docview/667560331?accountid=142257 (Year: 1999).*
European Search Report for EP12854004.4 dated Jul. 14, 2015.
European Search Report for EP12863342.7 dated Jul. 29, 2015.
European Search Report for EP13857798 dated Apr. 26, 2016.
International Search Report and Written Opinion for PCT/KR2013/007775 dated Nov. 21, 2013.
International Search Report and Written Opinion for PCT/KR2014/007791 dated Nov. 28, 2014.
International Search Report for PCT/KR2014/011237 dated Feb. 24, 2015.
International Search Report for PCT/KR2014/010130 dated Dec. 26, 2014.
International Search Report for PCT/KR2014/010124 dated Feb. 5, 2015.
International Search Report and Written Opinion for PCT/KR2014/007794 dated Nov. 21, 2014.
International Search Report for PCT/KR2014/011238 dated Feb. 24, 2015.
International Search Report and Written Opinion for PCT/KR2012/011585 dated Mar. 28, 2013.
International Search Report and Written Opinion for PCT/KR2012/010324 dated Feb. 27, 2013.
International Search Report and Written Opinion for PCT/KR2013/010855 dated Jan. 29, 2014.
International Search Report and Written Opinion for PCT/KR2013/010859 dated Dec. 30, 2013.
International Search Report for PCT/KR2014/010008 dated Jan. 27, 2015.
International Search Report for PCT/KR2014/010006 dated Jan. 9, 2015.
International Search Report for PCT/KR2014/010131 dated Jan. 9, 2015.
International Search Report for PCT/KR2014/011701 dated Mar. 3, 2015.
Jung, "Applications, Solutions, and Field Services," SK Planet, Jun. 25, 2012, pp. 13-15.
Kim, "Trend on World Market of Smart Phone Mobile Payment and Secure Project," BC Card, Oct. 14, 2010, pp. 27-28, pp. 32-33.
Labrou et al., "Wireless Wallet," Proceedings of the First Annual International Conference on Mobile and Ubiquitous Systems: Networking and Services (MobiQuitous'04), IEEE, Aug. 22, 2004, p. 32-41 XIP 10721016A.
U.S. Appl. No. 14/369,990, Oct. 27, 2014, Office Action.
U.S. Appl. No. 14/369,990, Mar. 19, 2015, Final Office Action.
U.S. Appl. No. 14/362,251, Aug. 14, 2015, Office Action.
U.S. Appl. No. 14/369,990, Nov. 13, 2015, Office Action.
U.S. Appl. No. 14/362,251, Feb. 26, 2016, Final Office Action.
Denning et al. "Location-Based Authentication: Grounding Cyberspace for Better Security", Computer Fraud and Security, Oxford, GB, Feb. 1, 1996, pp. 12-16.
Kuseler et al. "Privacy Preserving, Real-Time and Location Secured Biometrics for mCommerce Authentication", Mobile Multimedia/Image Processing, Security, and Applications, 2011, SPIE, vol. 8063, No. 1, May 13, 2011, pp. 1-7.
U.S. Appl. No. 14/369,990, Jun. 29, 2016, Final Office Action.
U.S. Appl. No. 14/362,251, Oct. 20, 2016, Office Action.

* cited by examiner

METHOD FOR SETTING TEMPORARY PAYMENT CARD AND MOBILE DEVICE APPLYING THE SAME

CROSS REFERENCE TO RELATED APPLICATIONS

This is a National Stage of International Application No. PCT/KR2013/007775 filed Aug. 29, 2013, claiming priority based on Korean Patent Application No. 10-2012-0135940 filed Nov. 28, 2012, the contents of all of which are incorporated herein by reference in their entirety.

TECHNICAL FIELD

Methods and apparatuses consistent with exemplary embodiments relate to a method for setting a payment card, and more particularly, to a method for setting a mobile payment card to be used for payment and a mobile device applying the same.

BACKGROUND ART

To prevent double payment, a mobile wallet application sets one of the issued mobile payment cards as a main payment card and makes a payment.

It is possible to make a payment using a mobile payment card other than the main payment card. However, to do so, users should go through an operation of setting a mobile payment card that the user wishes to use for payment as a main payment card in advance.

When the user temporarily uses another mobile payment card to make a payment (for example, for one-time payment), the user should recover the original main payment card after finishing the payment. In this case, the operation of recovering the original main payment card may be a cumbersome procedure and may cause inconvenience to the user.

In addition, the operation of changing the main payment card to another payment card may also cause inconvenience or difficulty to the user, and the user may not be accustomed to that operation, considering that mobile commerce is still at an early stage.

DISCLOSURE

Technical Problem

One or more exemplary embodiments provide a method for setting a temporary payment card, which sets, as a temporary payment card, a mobile payment card which is moved by a user from among mobile payment cards listed in a list, and resets the setting of the temporary payment card when a payable time passes, so that a user can change the temporary payment card more easily, swiftly, naturally, amusingly, and intuitively, and a mobile device applying the same.

Technical Solution

According to an aspect of an exemplary embodiment, there is provided a method for setting a temporary payment card, including: displaying a list of mobile payment cards; setting, as a temporary payment card, a mobile payment card which is moved by a user from among the mobile payment card listed in the list; and resetting the setting of the temporary payment card when a payable time passes.

The method may further include, when the moved mobile payment card is moved to an original position by the user, resetting the setting of the temporary payment card.

The method may further include displaying a remaining payable time.

The method may further include, when a payment is made within the payable time, resetting the setting of the temporary payment card.

The method may further include, when the payable time passes, moving the mobile payment card moved by the user to an original position.

The method may further include gradually moving the mobile payment card moved by the user to an original position according to a remaining payable time.

The method may further include, when the mobile payment card set as the temporary payment card is moved again by the user prior to the payable time passing, extending the payable time.

The movement by the user in the setting operation may be performed in a same method as the movement by the user in the extending operation.

The method may further include, when the mobile device is moved by the user in a specific pattern prior to the payable time passing, extending the payable time.

The method may further include, when the payable time passes, making the mobile payment card moved by the user disappear.

The method may further include making the mobile payment card moved by the user gradually disappear according to a remaining payable time.

The method may further include, when the remaining payable time is shorter than or equal to a threshold, outputting an alarm.

The method may further include: displaying a list of additional services issued to the mobile device; and setting an additional service moved by the user from among the additional services listed in the list to be used.

The method may further include, when a usable time passes, setting the additional service to be disabled.

According to another aspect of an exemplary embodiment, there is provided a mobile device including: a touch screen configured to display a list of mobile payment cards; and a processor configured to set, as a temporary payment card, a mobile payment card which is moved by a user from among the mobile payment cards listed in the list displayed on the touch screen, and reset the setting of the temporary payment card when a payable time passes.

Advantageous Effects

According to exemplary embodiments described above, a mobile payment card moved by a user from among mobile payment cards listed in a list is set as a temporary payment card, and, the setting of the temporary payment card is reset when a payable time passes, so that the temporary payment card can be changed more easily and swiftly.

In addition, an appropriate time desired by the user may be set as a payable time, and the payable time may be extended or forcedly terminated. Therefore, user convenience can be improved.

In addition, various visual effects and animation effects are provided, so that the user can set a temporary payment card through a familiar and intuitive operation, and the operation of manipulating the mobile device may bring the user a sense of fun and amusement.

BEST MODE

Hereinafter, the present disclosure will be explained in detail with reference to the accompanying drawings.

Figure 1:
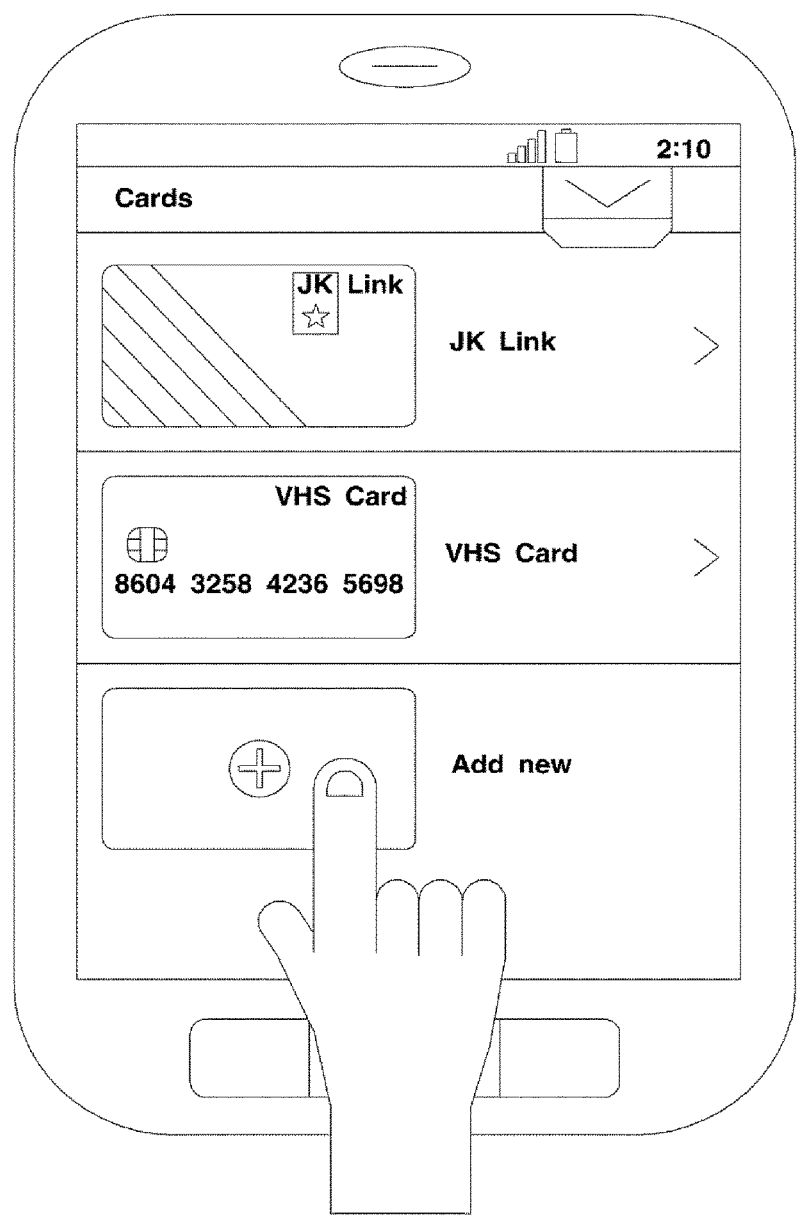
FIG. 1 is a view showing a mobile device which displays a mobile payment card management screen.

FIG. 1 is a view showing a mobile device which displays a mobile payment card management screen. On the mobile payment card management screen shown in FIG. 1, a user may add a mobile payment card to a list by selecting the "Add new" item.

Figure 2:
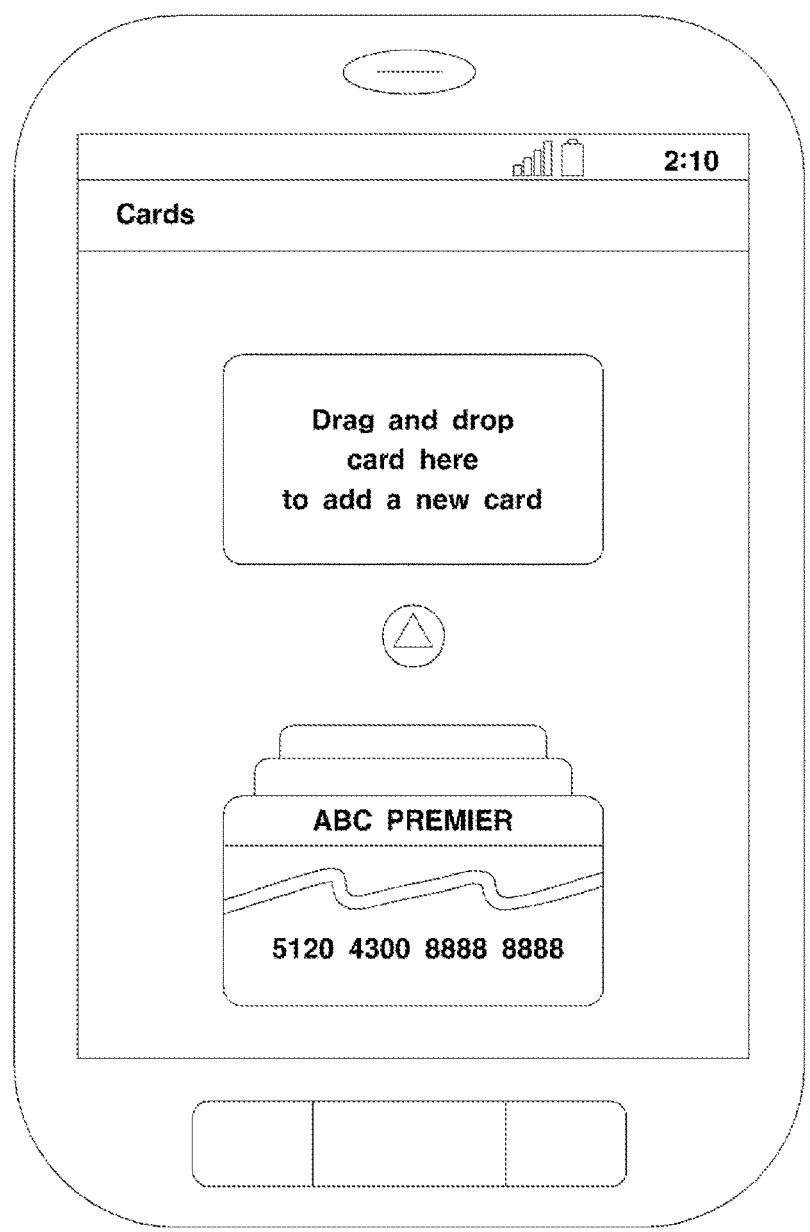
FIG. 2 is a view showing a mobile payment card addition screen.

FIG. 2 illustrates the mobile device displaying a mobile payment card addition screen which is provided when the user select the "Add new" item. As shown in FIG. 2, the mobile payment card addition screen shows mobile payment cards which are issued to a Secure Element (SE) of the mobile device on the lower portion thereof.

Figure 3:
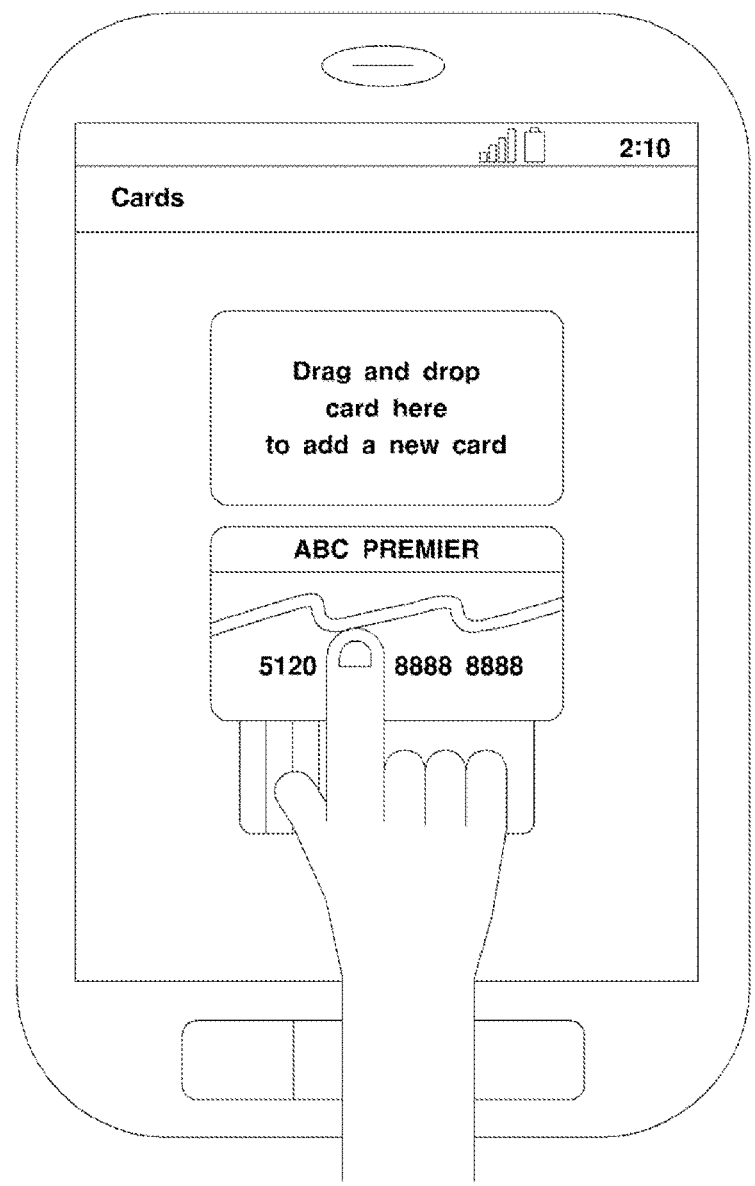
FIG. 3 is a view showing a screen when a user drags a mobile payment card to add to a mobile payment card list.
Figure 4:
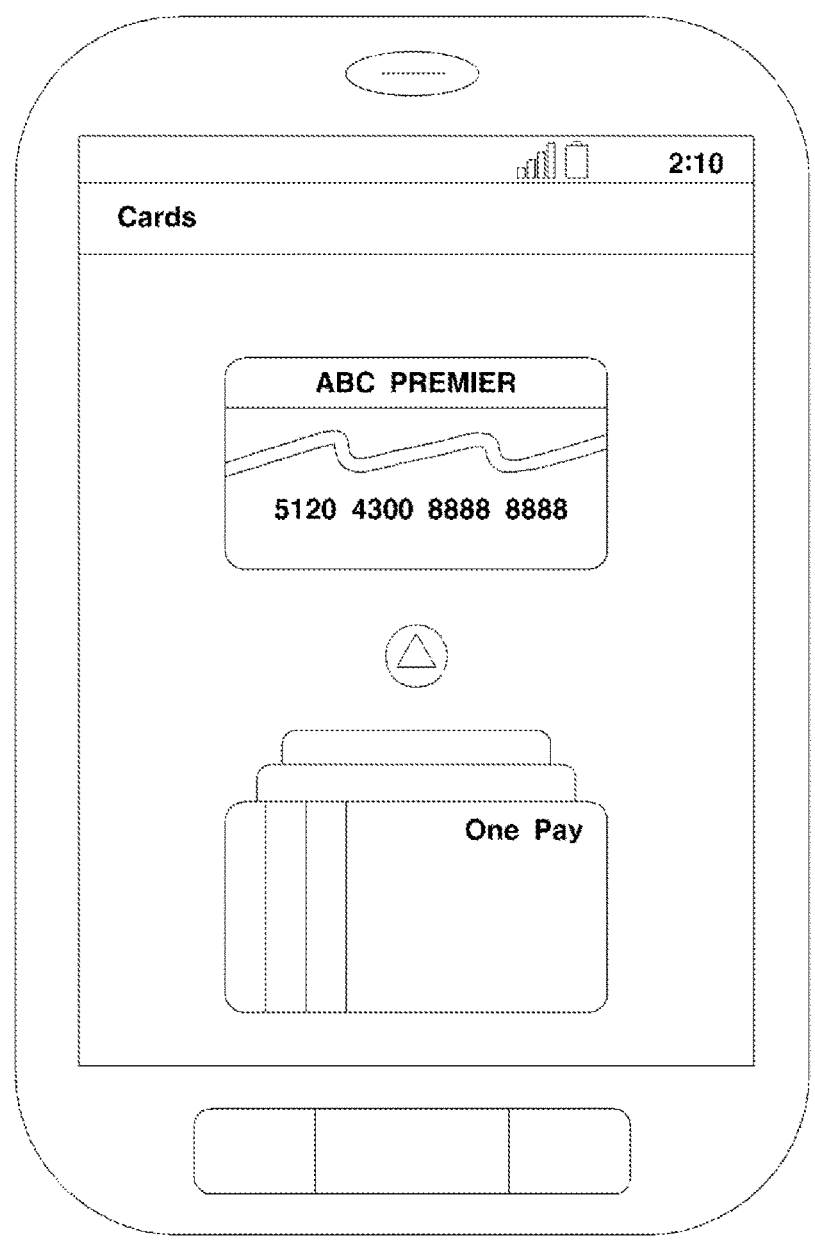
FIG. 4 is a view showing a screen when the user drops the mobile payment card to an additional area provided on the upper portion of the mobile payment card addition screen.
Figure 5:
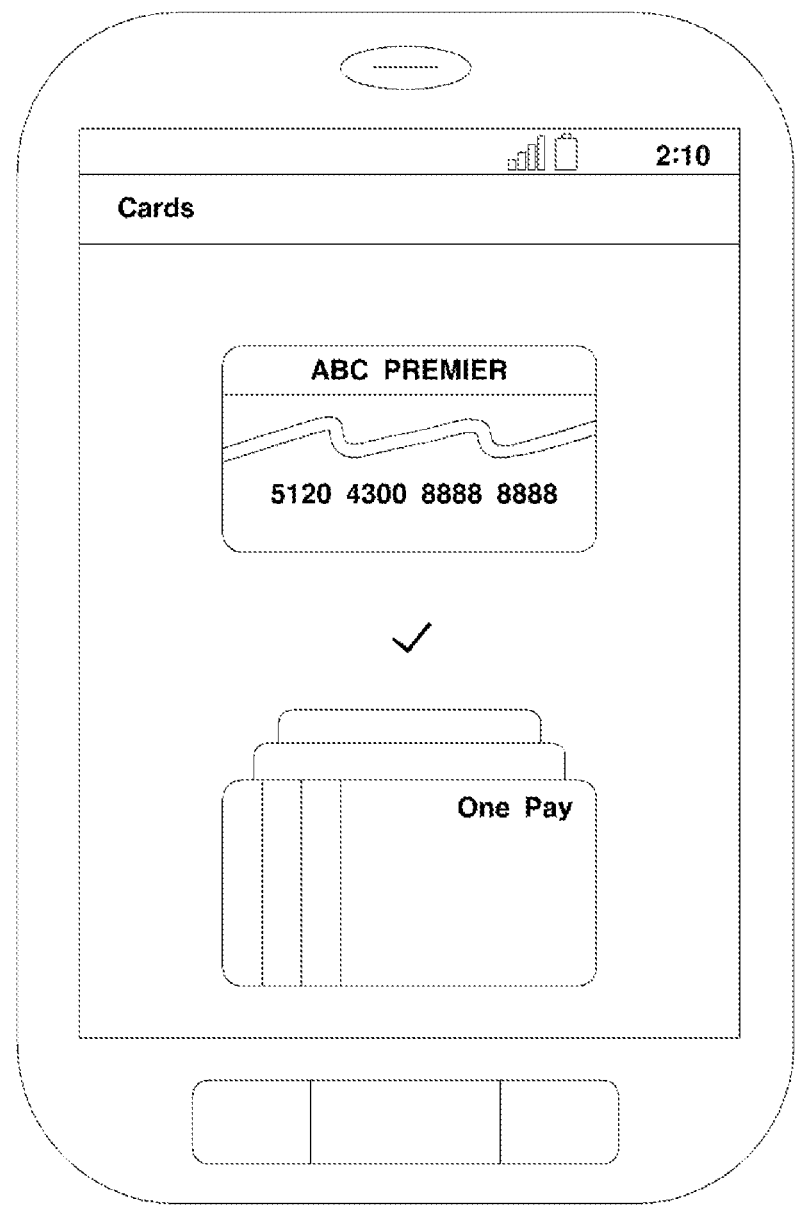
FIG. 5 is a view showing a screen on which a guide mark informing that a mobile payment card is selected is displayed on the center of the mobile payment card addition screen.

When the user drags a mobile payment card to add to the mobile payment card list as shown in FIG. 3, and drops the mobile payment card to an additional area provided on the upper portion of the mobile payment card addition screen as shown in FIG. 4, the "V" mark is displayed on the center of the mobile payment card addition screen, informing that the mobile payment card to be added has been selected, as shown in FIG. 5.

Figure 6:
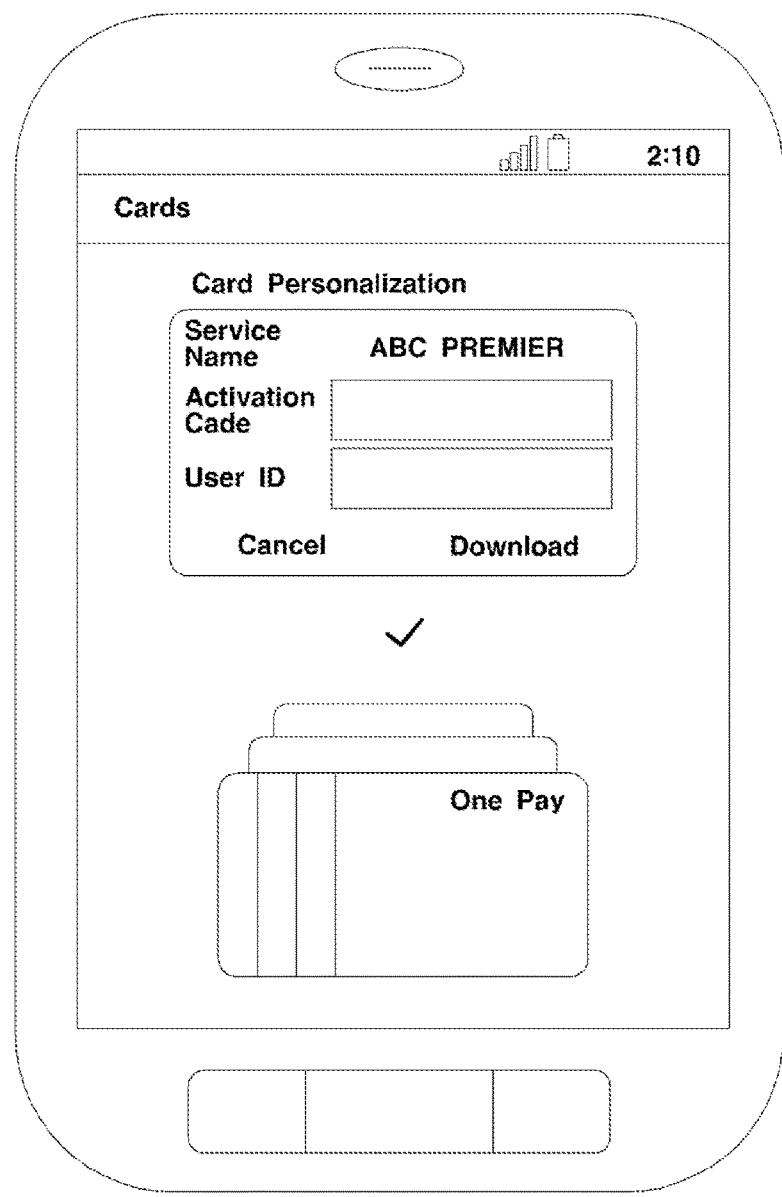
FIG. 6 is a view showing a mobile device on which an input window for inputting "Activation Code" and "User ID" of the mobile payment card is displayed.

Thereafter, as shown in FIG. 6, the mobile payment card which has been dragged and dropped disappears from the mobile payment card addition screen, and an input window for entering "Activation Code" and "User ID" of the mobile payment card is displayed.

Figure 7:
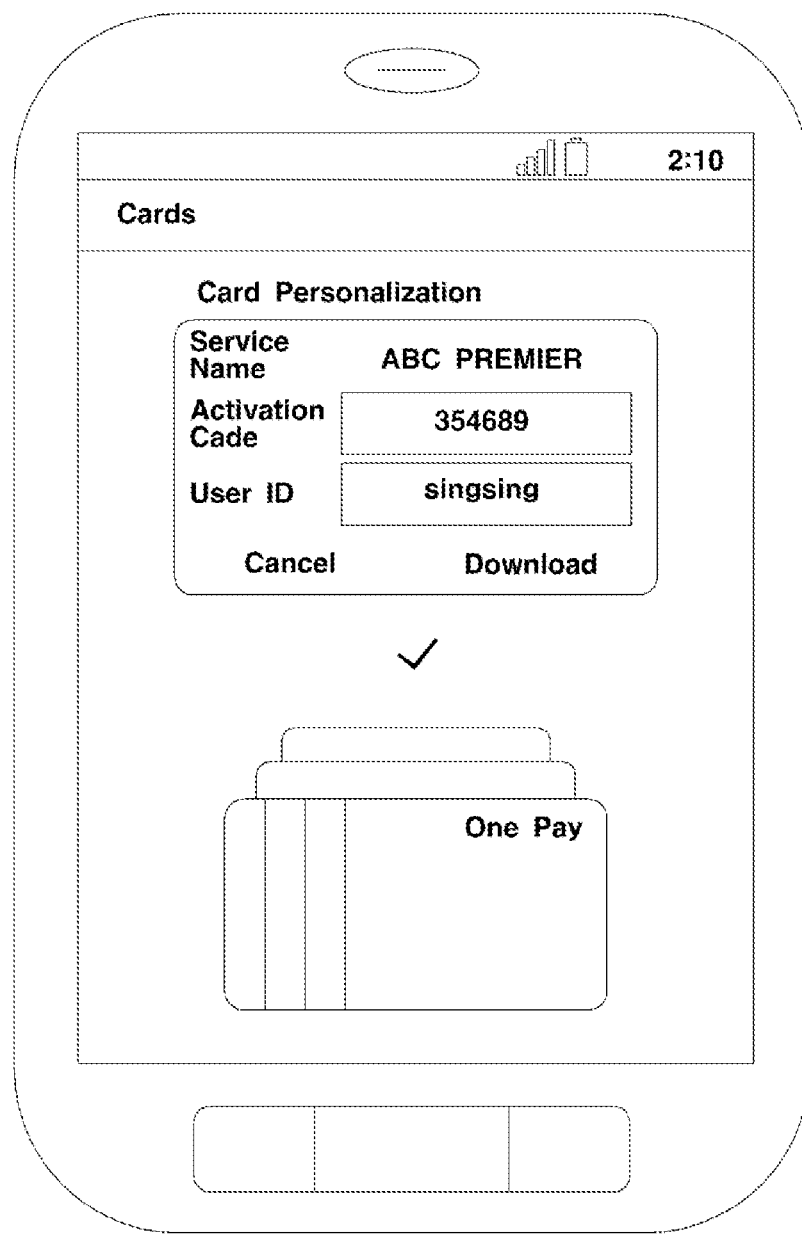
FIG. 7 is a view showing a state in which "Activation Code" and "User ID" are entered by the user through the input window.
Figure 8:
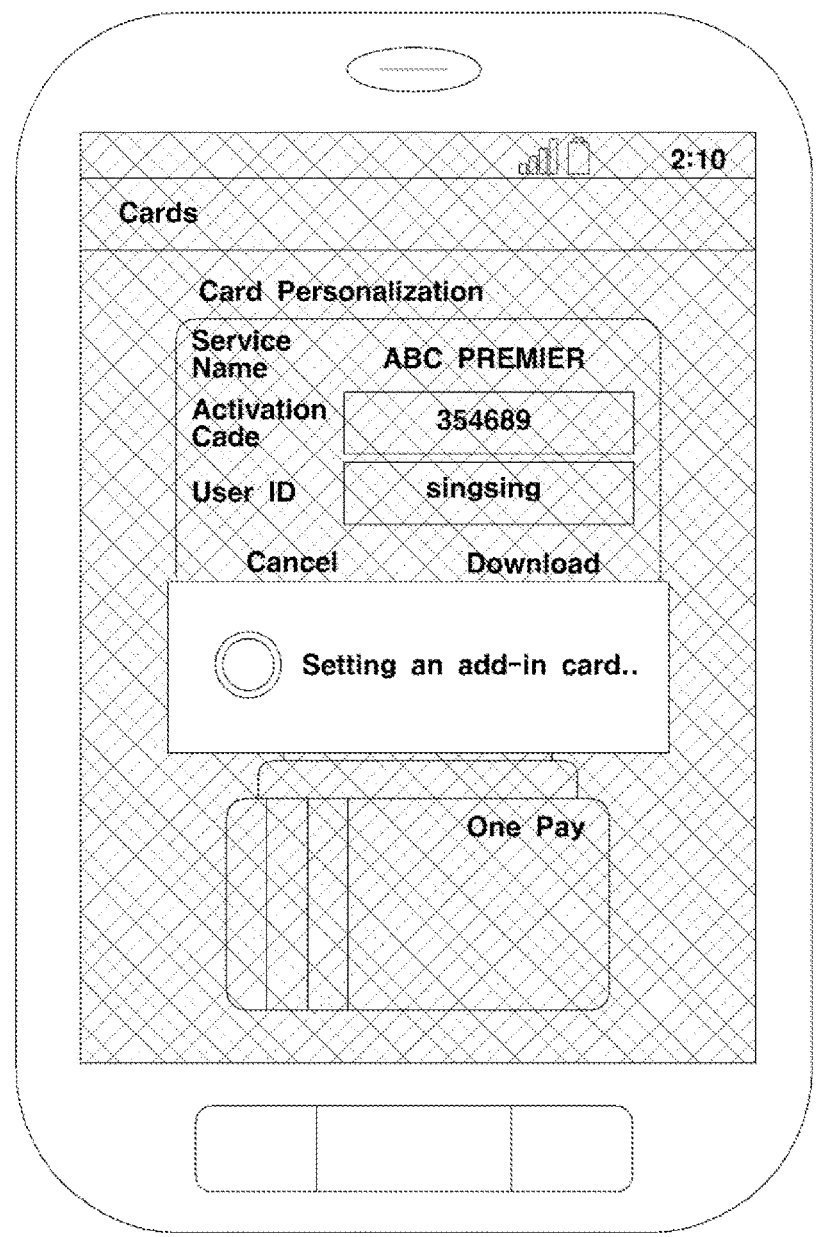
FIG. 8 is a view showing a guide screen informing that addition of a mobile payment card is in progress.
Figure 9:
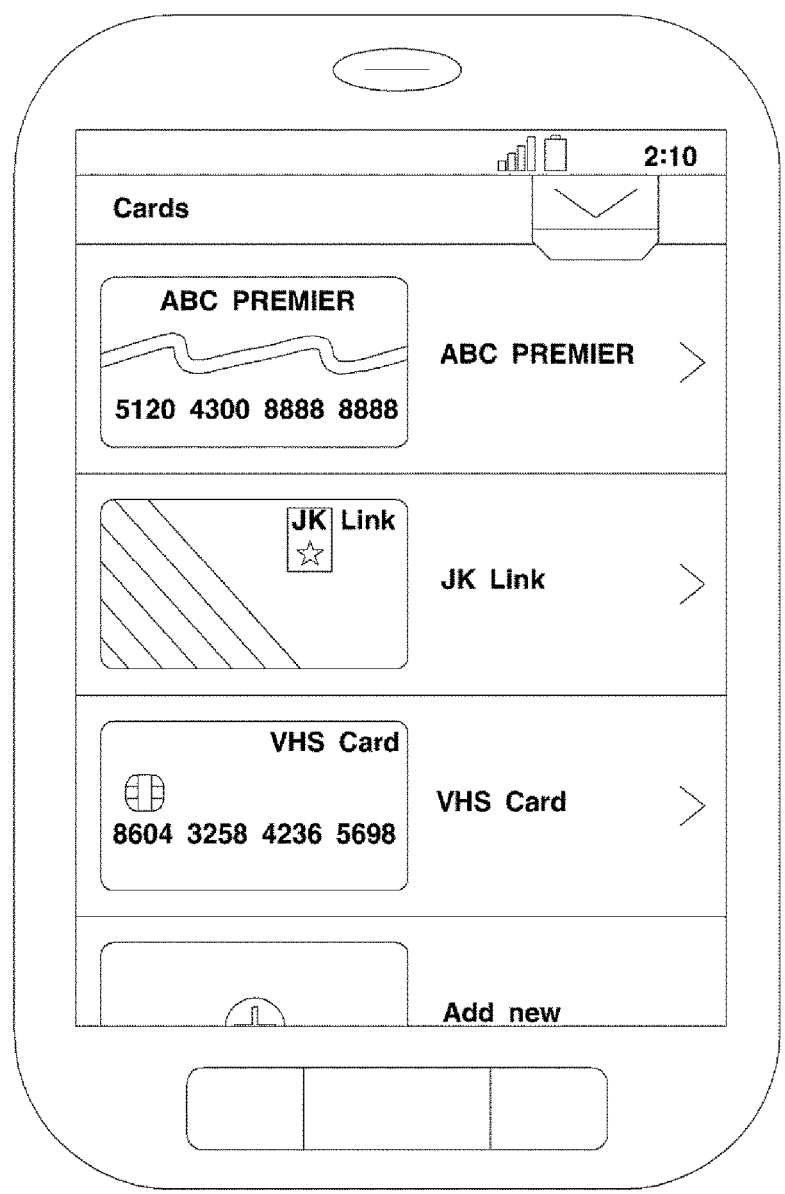
FIG. 9 is a view showing the mobile payment card management screen in which a mobile payment card is added.

When the user enters "Activation Code" and "User ID" through the input window as shown in FIG. 7, the process of adding the mobile payment card is performed as shown in FIG. 8, and the selected mobile payment card is added to the list on the mobile payment card management screen as shown in FIG. 9.

One of the mobile payment cards listed in the list is set as a main payment card and is used as a payment means when the user makes a payment using the mobile device. The main payment card may be set through the mobile payment card management screen and also may be set through a mobile wallet application.

The user may make a temporary payment using a mobile payment card other than the main payment card. To achieve this, the user should set a mobile payment card to be used for temporary payment as a temporary payment card.

Hereinafter, a method for setting a temporary payment card according to an exemplary embodiment of the present disclosure will be explained with reference to FIGS. 10 to 13. For the convenience of explanation and understanding, it is assumed that the mobile payment card set as a main payment card is "VHS Card" and the mobile payment card se as a temporary payment card is "ABC PREMIER."

Figure 10:
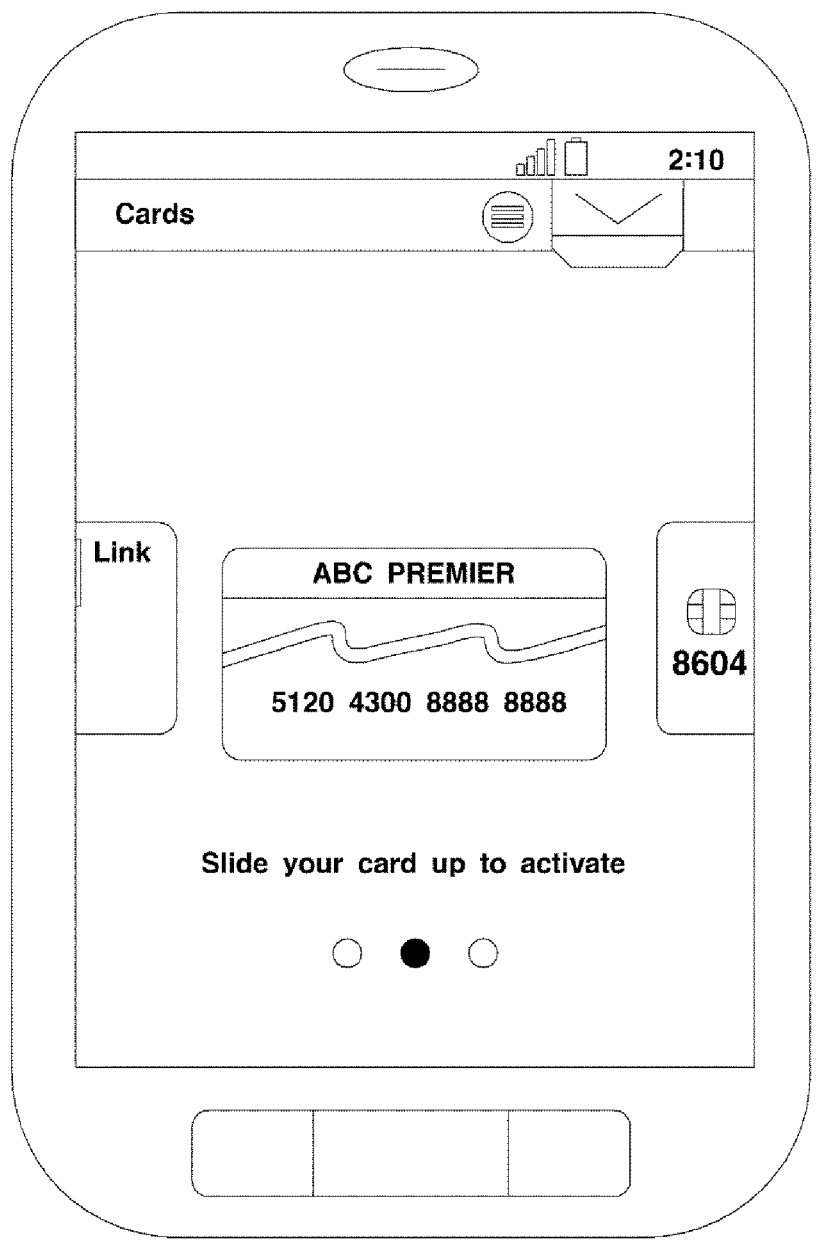
FIG. 10 is a view showing a mobile device displaying a payment card selection screen of a mobile wallet application.

FIG. 10 is a view showing a mobile device which displays a payment card selection screen of a mobile wallet application. As shown in FIG. 10, on the payment card selection screen, a list of mobile payment cards is displayed in the form of a cover flow view.

Figure 11:
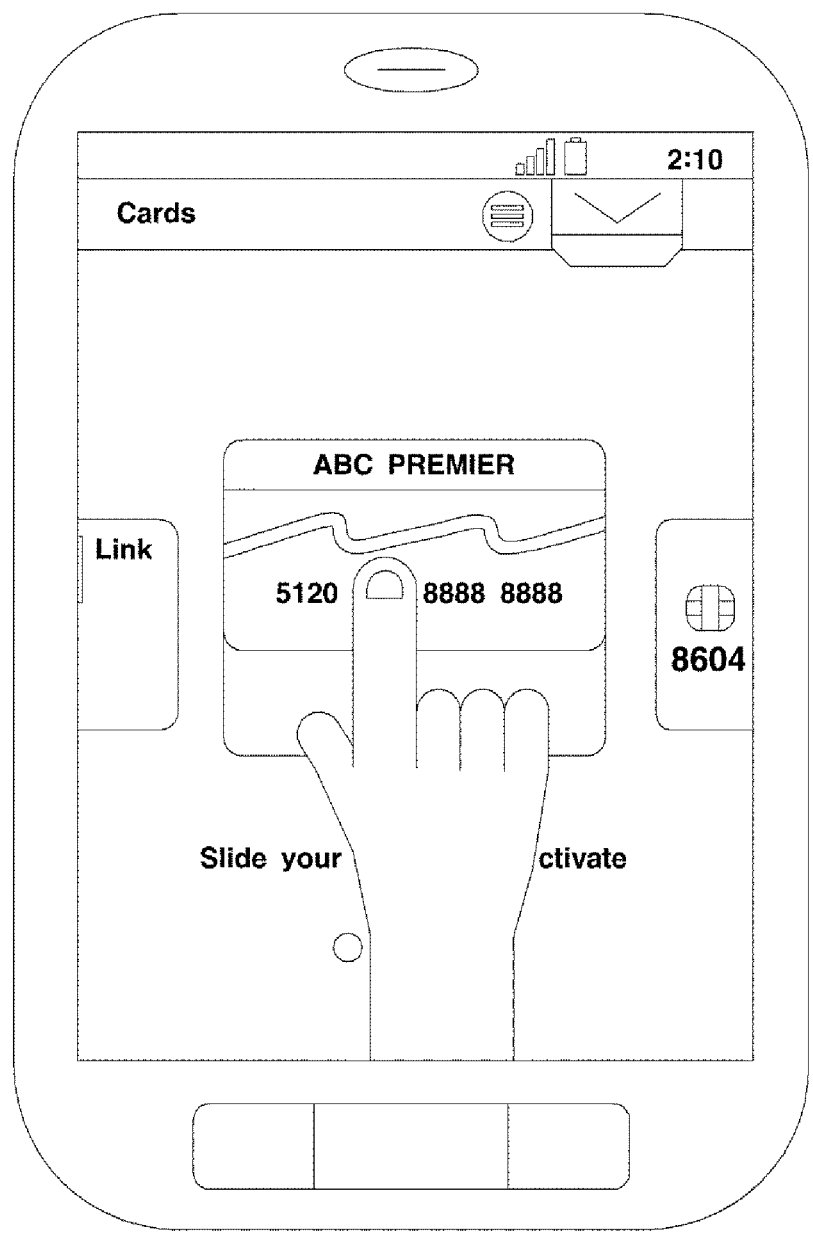
FIG. 11 is a view showing a screen when the user slides up a mobile payment card.

The user may select a mobile payment card from the mobile payment card list to use as a temporary payment card by sliding up the mobile payment card. FIG. 11 illustrates a screen when the user slides up the "ABC PREMIER" card to select as a temporary payment card, and FIG. 12 illustrates a resulting screen when the "ABC PREMIER" card is moved to the upper portion of the payment card selection screen by the user's sliding-up operation.

Figure 12:
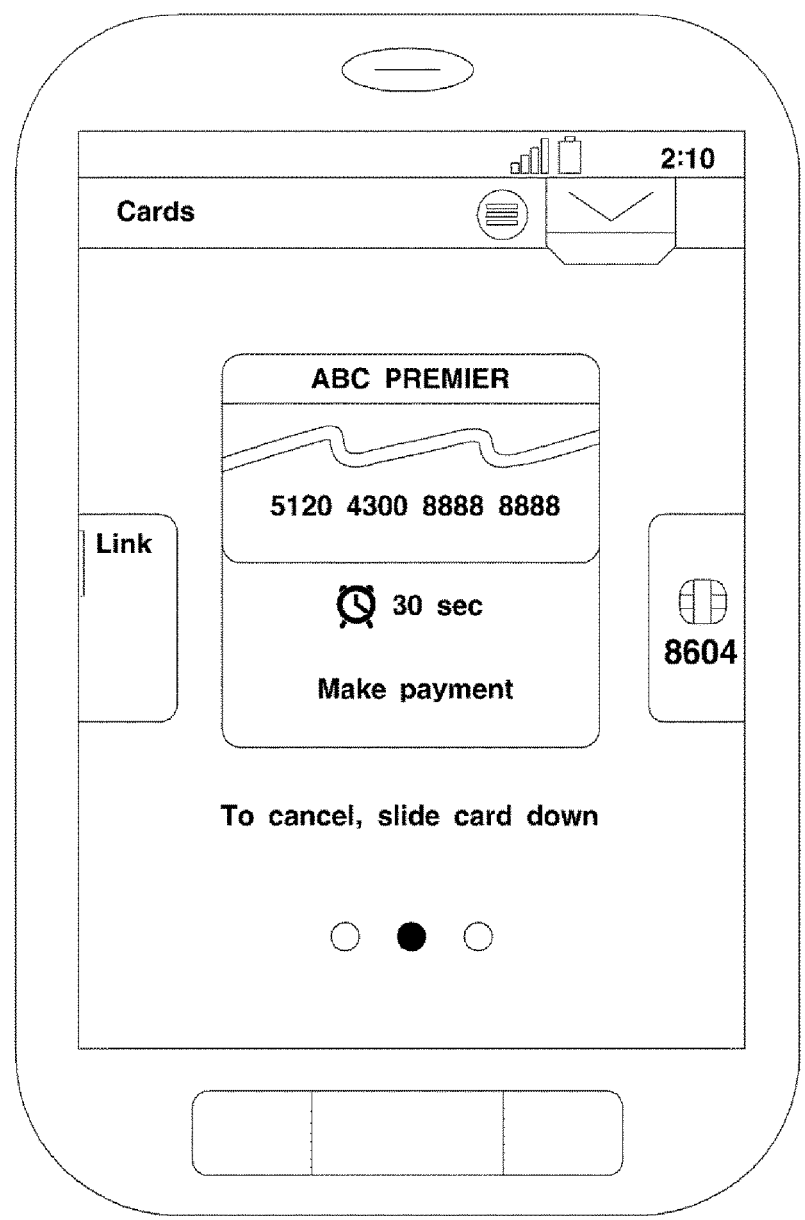
FIG. 12 is a view showing a resulting screen when the mobile payment card is moved to the upper portion of the payment card selection screen by the sliding-up operation.

The user's sliding-up operation is not necessarily performed from the position of the "ABC PREMIER" card shown in FIG. 10 to the position of the "ABC PREMIER" card shown in FIG. 12. An animation effect may be applied such that the "ABC PREMIER" card is automatically moved from the position of FIG. 10 to the position of FIG. 12 by a slight sliding-up operation.

As described above, the "ABC PREMIER" card slid up by the user is set as a temporary payment card. In this case, when the mobile device is brought into contact with a mobile payment reader such as a Near Field Communication (NFC) reader of Point of Sale (POS), a payment is made by the "ABC PREMIER" card which is a temporary payment card.

The payment by the temporary payment card should be made within a "payable time." That is, when the payable time passes, the setting of the temporary payment card is reset and a payment is made by a main payment card.

The remaining payable time is informed for the user as shown in FIG. 12. The payable time may be set/changed by the user through the above-described mobile payment card management screen or mobile wallet application.

When the payable time passes, the slid up "ABC PREMIER" card is slid down and moves to the original position shown in FIG. 10. To let the user know that the setting of the temporary payment card is reset, the sliding-down process may be performed more slowly than the sliding-up process. Furthermore, an announcement to inform the reset of the setting of the temporary payment card may be outputted through visual information or voice/sound information, and may be outputted through a vibration.

When the payment is made within the payable time, the setting of the temporary payment card is reset. This is to prevent double payment.

Figure 13:
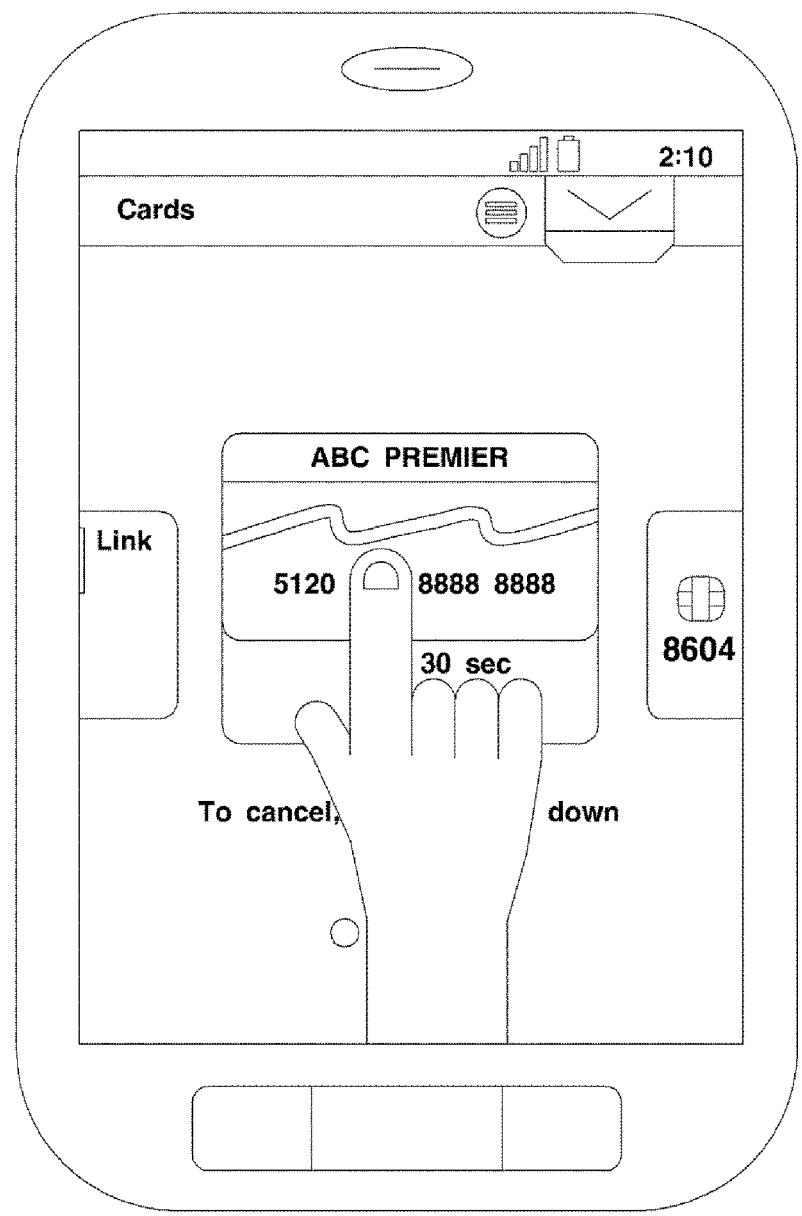
FIG. 13 is a view showing a screen when the user intentionally slides down a temporary payment card.

When the user intentionally slides down the temporary payment card as shown in FIG. 13 even if the payable time still remains, the setting of the temporary payment card is reset.

The payable time may be extended. For example, when the mobile device is shaken horizontally by the user more than three times before the payable time passes, the payable time may be set to be extended. The gesture of shaking the mobile device is merely an example and may be substituted with a gesture of a different pattern.

To extend the payable time or induce rapid payment, the mobile device may be set to output an alarm when 3 seconds remain as a payable time. The alarm may output an announcement for informing that the reset of the setting of the temporary payment card is imminent not only through visual information or voice/sound information but also through a vibration.

Hereinafter, a method for setting a temporary payment card according to another exemplary embodiment of the present disclosure will be explained with reference to FIGS. 14 to 19.

Figure 14:
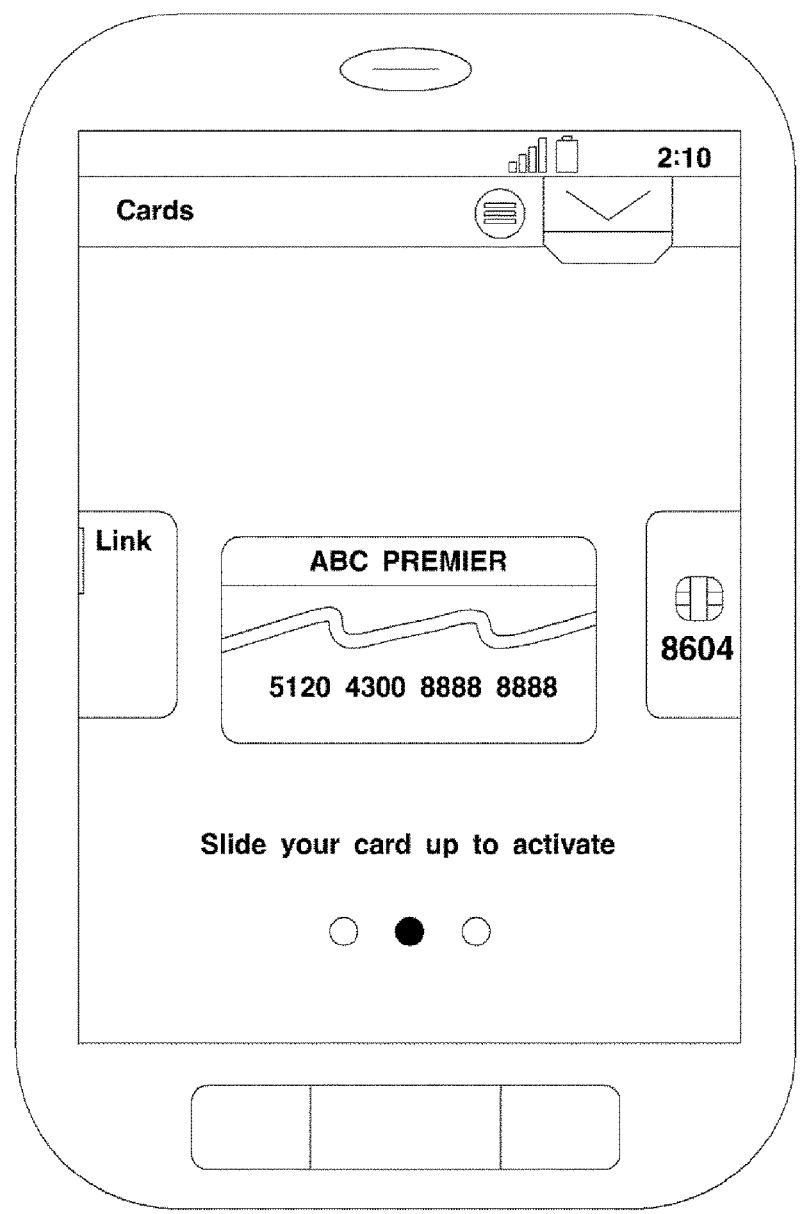
FIG. 14 is a view showing a mobile device which displays a payment card selection screen of a mobile wallet application.
Figure 15:
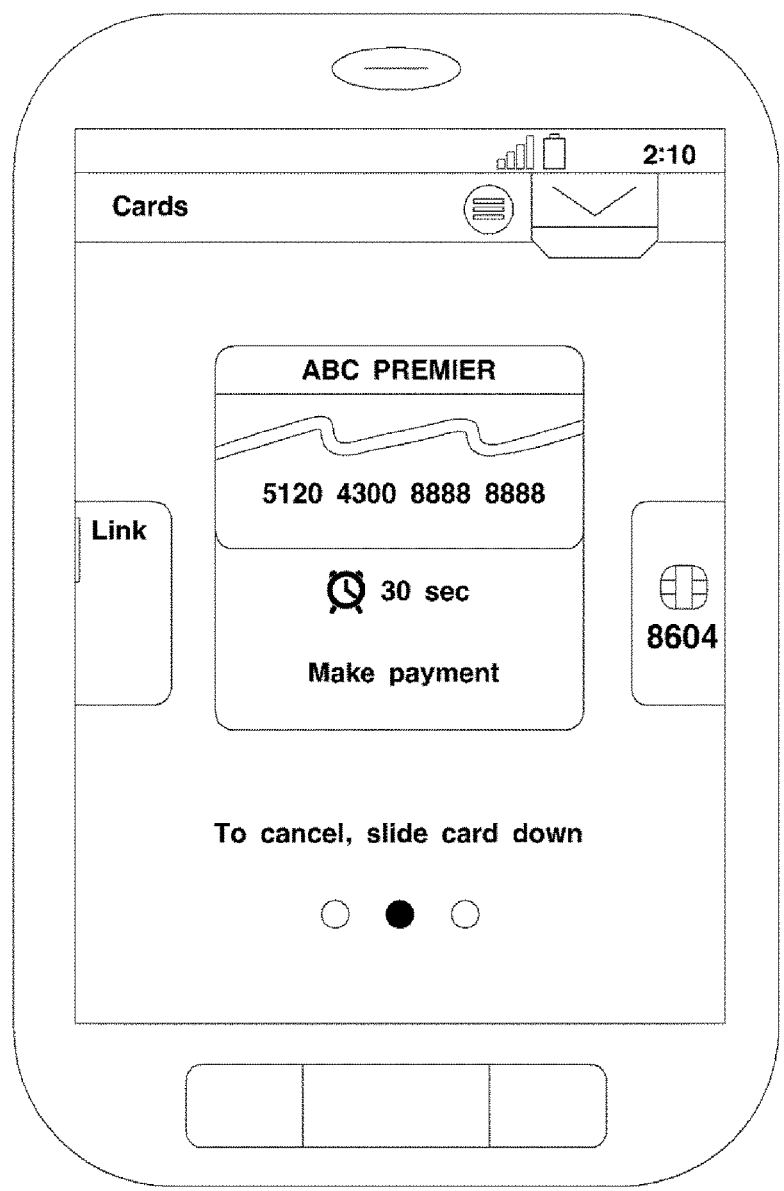
FIG. 15 is a view showing a resulting screen when a mobile payment card is slid up by the user and is selected/set as a temporary payment card.

FIG. 14 is a view showing a mobile device which displays a payment card selection screen of a mobile wallet application, and FIG. 15 is a view illustrating a resulting screen when the "ABC PREMIER" card is slid up by the user and selected/set as a temporary payment card.

Figure 16:
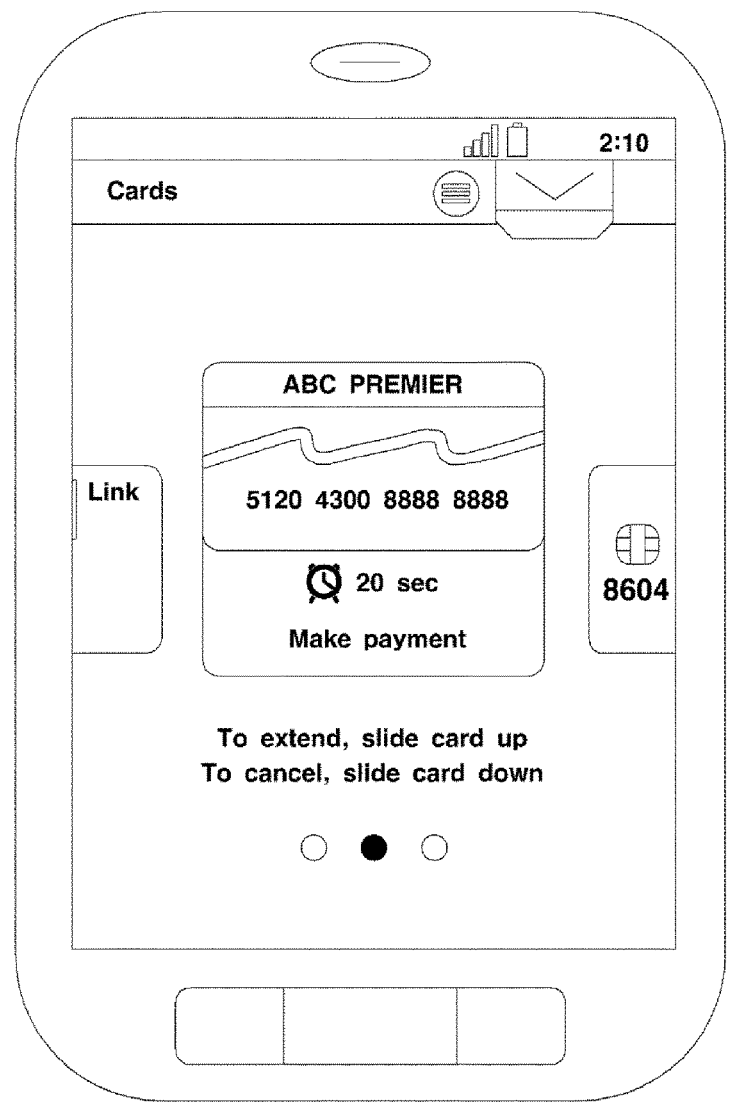
FIG. 16 is a view showing a payment card selection screen when 10 seconds of a payable time pass.

In FIG. 15, "30 seconds" are informed as a remaining payable time. FIG. 16 illustrates the payment card selection screen after 10 seconds pass. As shown in FIG. 16, the "ABC PREMIER" card is slid down by ⅓ of the total distance by which the card has been slid up, and "20 seconds" are identified as a remaining payable time.

Figure 17:
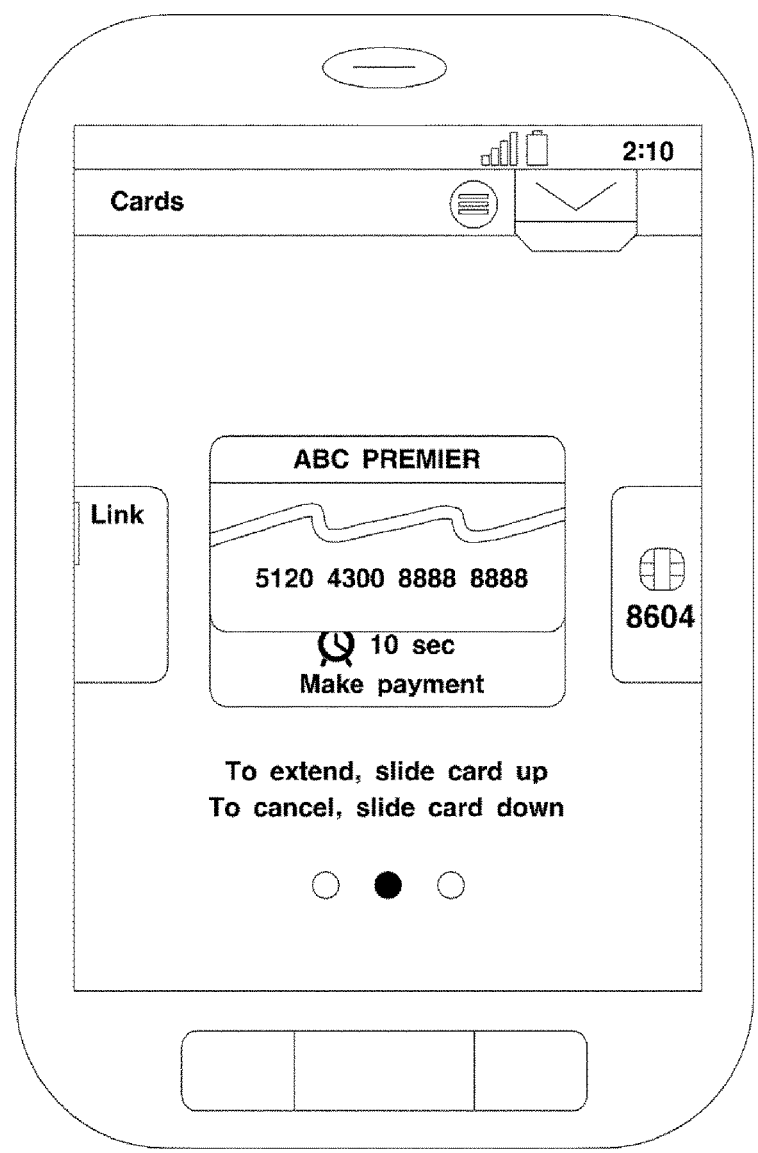
FIG. 17 is a view showing a payment card selection screen when 20 seconds of a payable time pass.

FIG. 17 illustrates the payment card selection screen when 10 more seconds pass. Referring to FIG. 17, the "ABC PREMIER" card is slid down by ⅔ of the total distance by which the card has been slid up and "10 seconds" are identified as a remaining payable time.

Referring to FIGS. 15 to 17, the mobile payment card slid up by the user, that is, the mobile payment card selected/set as the temporary payment card is slowly slid down as the payable time passes and moves to the original position. In this case, the slid-down distance is in reverse proportion to the remaining payable time.

Figure 18:
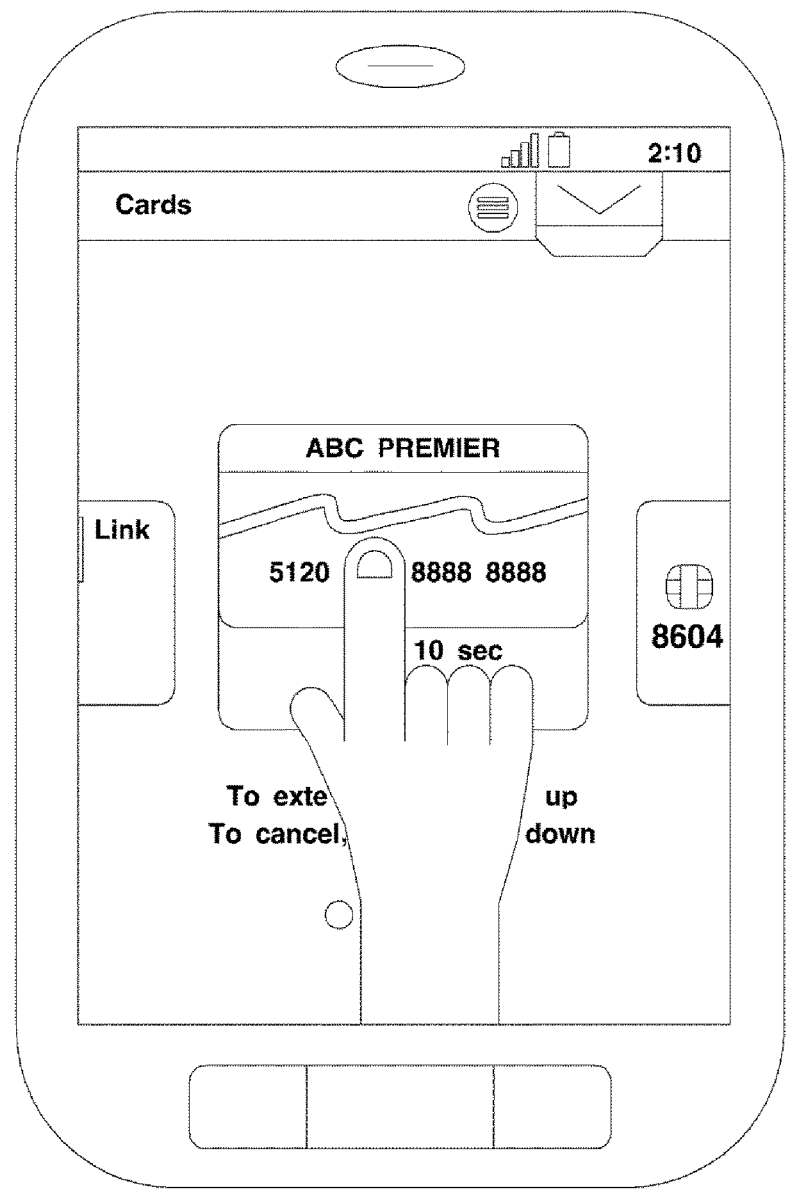
FIG. 18 is a view showing a state in which the mobile payment card is slid up again by the user before the payable time passes.
Figure 19:
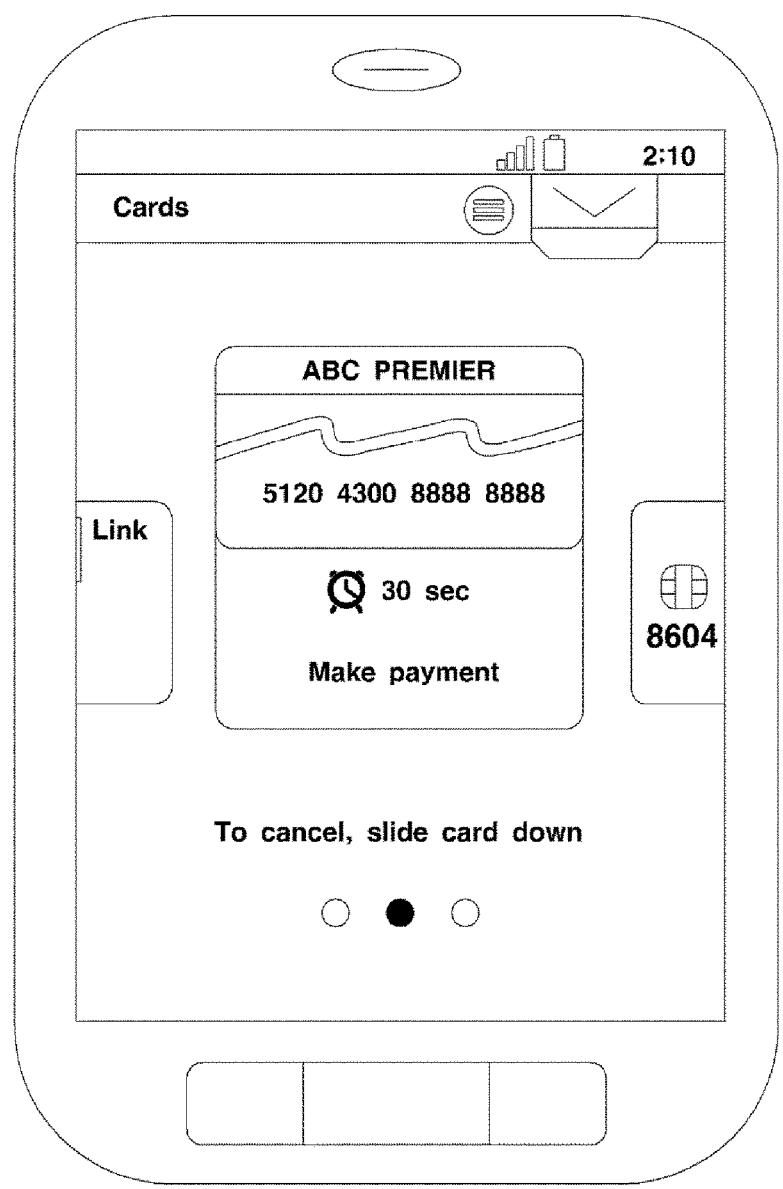
FIG. 19 is a view showing a state in which the payable time is extended.

When the mobile payment card which is being slid down is slid up again by the user before the payable time passes as shown in FIG. 18, the payable time is extended as shown in FIG. 19.

In the present exemplary embodiment, the payable time may be set to be in proportion to the distance slid up by the user. That is, as the distance by which the card is slid up by the user is longer, the payable time may be longer, and, as the distance by which the card is slid up by the user is shorter, the payable time may be shorter. In addition, this is equally applied when a temporary payment time is extended.

Exemplary embodiments of the method for setting the temporary payment card have been described up to now.

In the above-described exemplary embodiments, a temporary payment card is selected by sliding up a mobile payment card. This is merely an example and variations are possible. That is, a different sliding direction may be set and the temporary payment card may be selected by other motions than the sliding motion.

In addition, in the above-described exemplary embodiments, the mobile payment card returns to its original position and the setting of the temporary payment card is reset when the payable time passes. However, this is merely an example.

For example, a visual effect making the mobile payment card disappear or explode and be scattered when the payable time passes may be provided. Furthermore, a visual effect making the mobile payment card gradually disappear or be scattered as the payable time passes may be provided.

The technical idea of the present disclosure may be applied to a thing other than the mobile payment card as an object to be selected by the user in the above-described exemplary embodiments.

For example, a list of mobile additional services (a mobile coupon, a mobile point, a mobile membership, etc.) issued to the mobile device may be displayed, and a mobile additional service slid up by the user from the mobile additional services listed in the list may be set to be used.

In this case, a usable time within which the mobile additional service can be used may be limited, and, when the usable time passes, the mobile additional service may be set to be disabled and slid down.

According to another exemplary embodiment, detailed information of the mobile additional service slid up by the user may be displayed. The detailed information of the mobile additional service may include 1) a mobile coupon number, a bar cord, a QR code, etc. in the case of the mobile coupon, 2) a mobile point card number, a mobile point score, etc. in the case of the mobile point, and 3) a mobile membership number, a membership ID, and etc. in the case of the mobile membership.

In this case, the usable time within which the mobile additional service can be used may be limited, and, the detailed information of the service may be set to disappear when the usable time passes.

Figure 20:
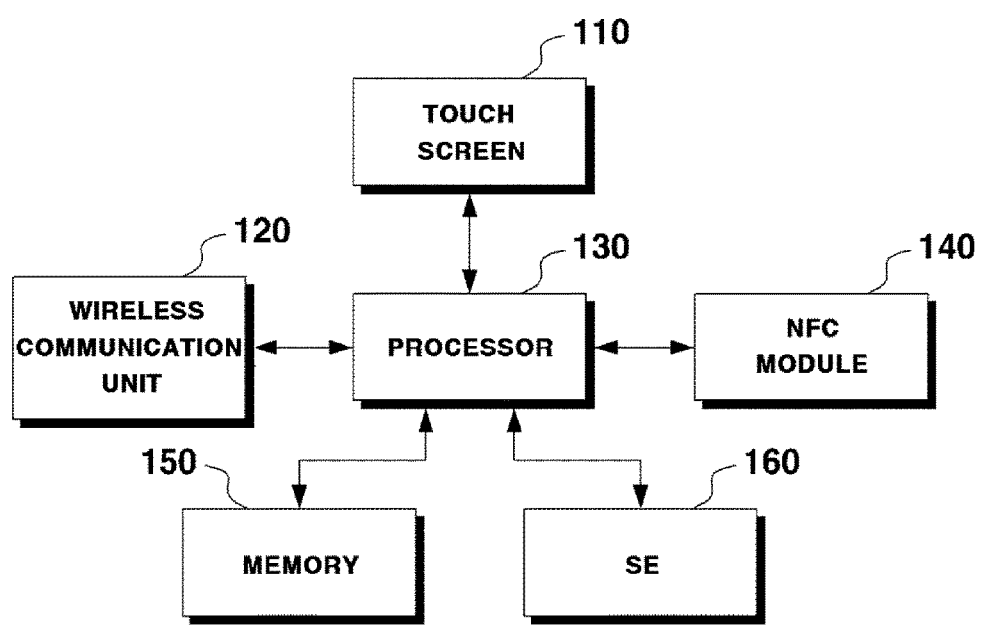
FIG. 20 is a block diagram showing a mobile device to which the present disclosure is applicable.

FIG. 20 is a block diagram showing a mobile device according to another exemplary embodiment of the present disclosure. The mobile device 100 according to the present exemplary embodiment includes a touch screen 110, a wireless communication unit 120, a processor 130, an NFC module 140, a memory 150, and an SE 160, as shown in FIG. 20.

The touch screen 110 functions as a display for displaying screens shown in FIGS. 1 to 19, and also functions as a user inputting means for receiving a user operation such as touching, dragging and dropping, sliding, etc.

The wireless communication unit 120 is a means for mobile communication and wireless networking, and the NFC module 140 is a module for transmitting payment information and mobile additional service information by communicating with an NFC reader.

The memory 150 is a storage medium in which the above-described mobile wallet application is installed, and the SE 160 is a storage medium in which the above-described mobile payment card, the mobile additional service, etc. are issued and stored, and may be implemented by using a Universal IC card (UICC), an embedded-SE (e-SE), a Secure Digital (SD) card, etc. The SE 160 may include the NFC module 140.

The processor 130 displays a list of mobile payment cards on the touch screen 110, and sets a mobile payment card selected by the user through the touch screen 110 as a temporary payment card, and resets the setting of the temporary payment card when a payable time passes.

In addition, the processor 130 may display a remaining payable time and perform all interactions shown in FIGS. 1 to 19, such as resetting the setting of the temporary payment card or extending the payable time, according to a user command.

The technical idea of the present disclosure may be applied to a computer-readable recording medium which records a computer program for performing the functions of the apparatus and method according to exemplary embodiments. In addition, the technical idea according to various exemplary embodiments of the present disclosure may be implemented in the form of a computer-readable code which is recorded on a computer-readable recording medium. The computer-readable recording medium may include any data storage device which can be read by a computer and can store data. For example, the computer-readable recording medium may include a Read Only Memory (ROM), a Random Access Memory (RAM), a CD-ROM, a magnetic tape, a floppy disk, an optical disk, a hard disk drive, and etc. In addition, a code or a program which is stored in a computer-readable recording medium and can be read by a computer may be transmitted through a network connected between computers.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A method for setting a temporary payment card, comprising:
displaying a list of mobile payment cards at a first portion of a touch screen interface;
receiving, through the touch screen interface, a user input selecting a mobile payment card from the list of mobile payment card;
detecting the user input sliding the mobile payment card from the first portion of the touch screen interface to a second portion of the touch screen interface;
based upon the user input sliding the mobile payment card, setting, as a temporary card, the mobile payment card, wherein while the mobile payment card is set as the temporary card, payments will be made by the mobile payment card;
displaying a numerical indicator of a payable time, wherein the numerical indicator initially indicates a first remaining time amount;
simultaneously:
moving the mobile payment card a first distance from the first portion of the screen towards a second portion of the touch screen, and
decrementing the numerical indicator a first difference to display a remaining payable time,
wherein:
the first distance is proportional to an amount of payable time that has passed, and
the first difference is proportional to the amount of payable time that has passed: and
resetting the setting of the temporary payment card when the payable time passes such that the mobile payment card is no longer set as the temporary card and payments are made through a main card.

2. The method of claim 1, further comprising:
receiving, through the touch screen interface, a user input selecting the mobile payment card;
detecting the user input sliding the mobile payment card from the second portion of the touch screen interface to an original position within the first portion of touch screen interface;
based upon the mobile payment card being moved to the original position by the user, resetting the setting of the temporary payment card.

3. The method of claim 1, further comprising, when a payment is made within the payable time, resetting the setting of the temporary payment card.

4. The method of claim 1, further comprising:
determining that the payable time has passed;
based upon the determination that the payable time has passed, displaying the mobile payment card being moved to an original position.

5. The method of claim 1, further comprising, when the mobile payment card set as the temporary payment card is moved again by the user prior to the payable time passing, extending the payable time.

6. The method of claim 5, wherein the movement by the user in the setting operation is performed in the same method as the movement by the user in the extending operation.

7. The method of claim 1, further comprising, when the mobile device is moved by the user in a specific pattern prior to the payable time passing, extending the payable time.

8. The method of claim 1, further comprising, when the payable time passes, making the mobile payment card moved by the user disappear.

9. The method of claim 1, further comprising making the mobile payment card moved by the user gradually disappear according to a remaining payable time.

10. The method of claim 1, further comprising, when the remaining payable time is shorter than or equal to a threshold, outputting an alarm.

11. The method of claim 1, further comprising:
displaying a list of additional services issued to the mobile devices; and
setting an additional service moved by the user from among the additional services listed in the list to be used.

12. The method of claim 11, further comprising, when a usable time passes, setting the additional service to be disabled.

13. A mobile device comprising:
a touch screen configured to display a list of mobile payment cards; and a processor configured to:
displaying a list of mobile payment cards at a first portion of a touch screen interface;
receive, through the touch screen interface, a user input selecting a mobile payment card from the list of mobile payment card;
detect the user input sliding the mobile payment card from the first portion of the touch screen interface to a second portion of the touch screen interface;
based upon the user input sliding the mobile payment card, set as temporary card, the mobile payment card, wherein while the mobile payment card is set as the temporary card, payments will be made by the mobile payment card;

displaying a numerical indicator of a payable time, wherein the numerical indicator initially indicates a first remaining time amount;

simultaneously:
   moving the mobile payment card a first distance from the first portion of the screen towards a second portion of the touch screen, and
   decrementing the numerical indicator a first difference to display a remaining payable time,
   wherein:
      the first distance is proportional to an amount of payable time that has passed, and
      the first difference is proportional to the amount of payable time that has passed: and reset the setting of the temporary payment card when the payable time passes.

\* \* \* \* \*